3,379,760
2-BROMOACETAMIDO-4-NITROPHENOL
Merrill Burr, New York, and Daniel E. Koshland, Jr., Bellport, N.Y., assignors to the United States of America as represented by the United States Atomic Energy Commission
No Drawing. Filed Aug. 5, 1965, Ser. No. 477,623
1 Claim. (Cl. 260—562)

ABSTRACT OF THE DISCLOSURE

This invention discloses a novel composition of matter, 2-bromoacetamido-4-nitrophenol which is useful in introducing environmental sensitive groups into proteins.

---

This invention relates to a novel composition of matter and method of using same.

Currently large research programs are being carried out in biological fields exploring the properties of enzymes. Enzymes are the key catalyst of living systems and are able to catalyze reactions more specifically and with greater power than any man-made catalyst discovered so far. To ascertain the mechanism by which enzymes function would therefore be of value not only in the chemical theory but also would have fundamental importance in medical applications.

It is an object of this invention to provide those skilled in the art with a new and useful composition of matter.

It is the further object of this invention to provide those skilled in the art with a method of introducing groups sensitive to environmental changes into specific parts of proteins such as enzyme molecules.

Other objects of this invention will, in part, be obvious and will appear hereinafter.

We have discovered 2-bromoacetamido 4-nitrophenol, a new composition of matter which is capable of reacting with the sulfhydryl, methionyl, tyrosyl, or lysyl residues of proteins. On such reaction the group which is sensitive to environment can introduce one such group per given molecule of an enzyme. The following example is given to illustrate our invention. Dropwise addition of 9.25 ml. of bromoacetyl bromide to 10 grams of 2-amino 4-nitrophenol in 80 ml. of acetone resulted in the concomitant precipitation of crystals. During the addition of bromoacetyl bromide a flask was shaken by hand and cooled when necessary in an ice bath. The crystals were filtered from the cooled solution and recrystallized three times from ethanol (analytical grade 95%) M.P. 207–208.5° C. (sealed tube) and again from ethanol M.P. 212–213° C. (sealed tube). Analysis calculated for $C_8N_2O_4BrH_7$: calculated C, 34.93; N, 10.19; Br, 29.05; H, 2.565. Found: C, 35.31; N, 10.01; Br, 29.91; H, 2.62. The absolute structure was established to be the one claimed above by infra-red analyses.

A check of the usefulness of this preparation was obtained by reaction of this compound with chymotrypsin in which case it was demonstrated that a single group was introduced and was covalently attached to the methionine residue, three residues from the active site of chymotrypsin. On introduction of substrates and inhibitors to this modified chymotrypsin characteristic absorption spectrum changes were obtained which related to the specificity of the molecule of the chymotrypsin.

Several beneficial features were obtained from this novel composition. The first is that it was demonstrated that a single residue could be introduced into an enzyme. In the second place, the spectrum was sensitive to environmental changes and did, indeed, change in the presence of substrates and inhibitors. It is presumed that this reagent can have wide applicability to many enzymes because of the reactivity of the bromoacetyl side chain. Moreover, the method itself should be of general utility since the environmentally sensitive group can be varied e.g. other dyes or fluorescent materials may be used, and the positioning group may also be varied, i.e., side chains may be devised to react with other amino acid residues.

We claim:
1. 2-bromoacetamido 4-nitrophenol.

References Cited

UNITED STATES PATENTS

| | | | |
|---|---|---|---|
| 2,863,752 | 12/1958 | Hamm et al. | 71—2.3 |
| 2,862,966 | 12/1958 | Surrey | 260—562 |
| 3,332,768 | 7/1967 | Freund et al. | 71—118 |

OTHER REFERENCES

J. of Bacteriology, vol. 57, 1949, pp. 339–347, Leonard et al.

Journal of Medical and Pharmaceutical Chemistry, vol. 5, No. 6, 1962, pp. 1379–1383.

WILLIAM H. SHORT, *Primary Examiner.*

H. SCHAIN, *Assistant Examiner.*